UNITED STATES PATENT OFFICE.

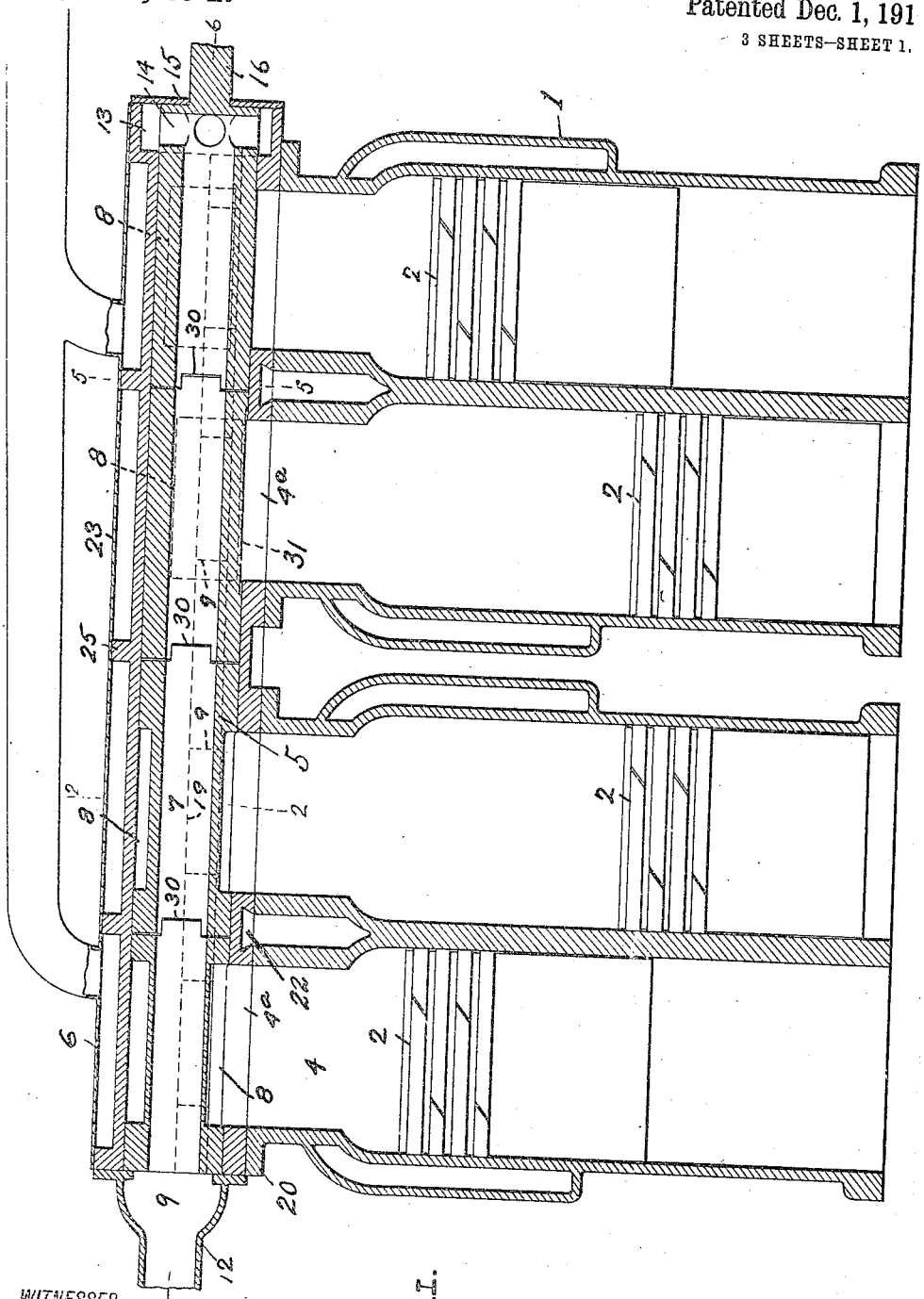
E. M. BOURNONVILLE.
INTERNAL COMBUSTION ENGINE.
APPLICATION FILED FEB. 11, 1914.
1,119,494.
Patented Dec. 1, 191
3 SHEETS—SHEET 1.
WITNESSES
G. Robert Thomas
E. Greenberger
INVENTOR
Eugene M. Bournonville
BY
ATTORNEY E. M. BOURNONVILLE.
INTERNAL COMBUSTION ENGINE.
APPLICATION FILED FEB. 11, 1914.
1,119,494.
Patented Dec. 1, 1914.
3 SHEETS—SHEET 2.
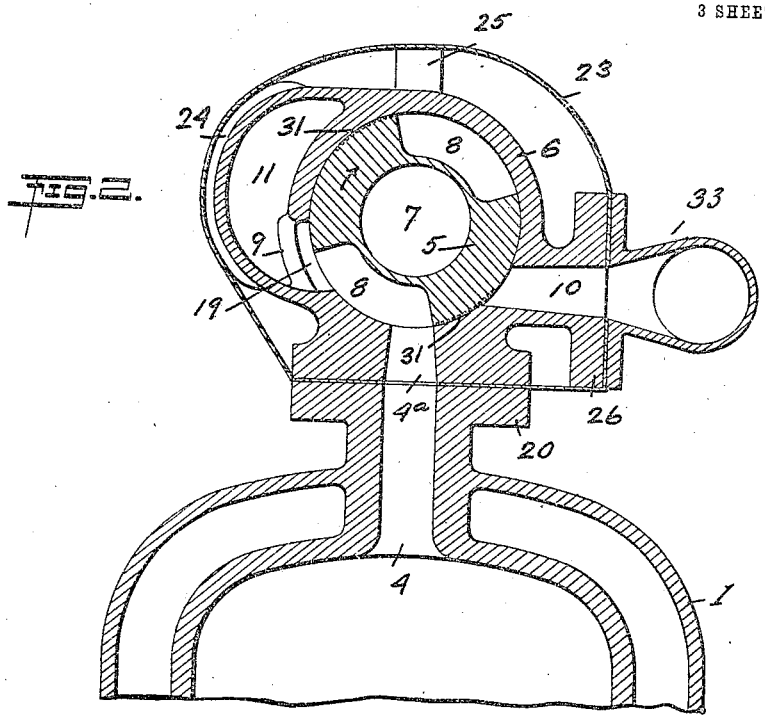
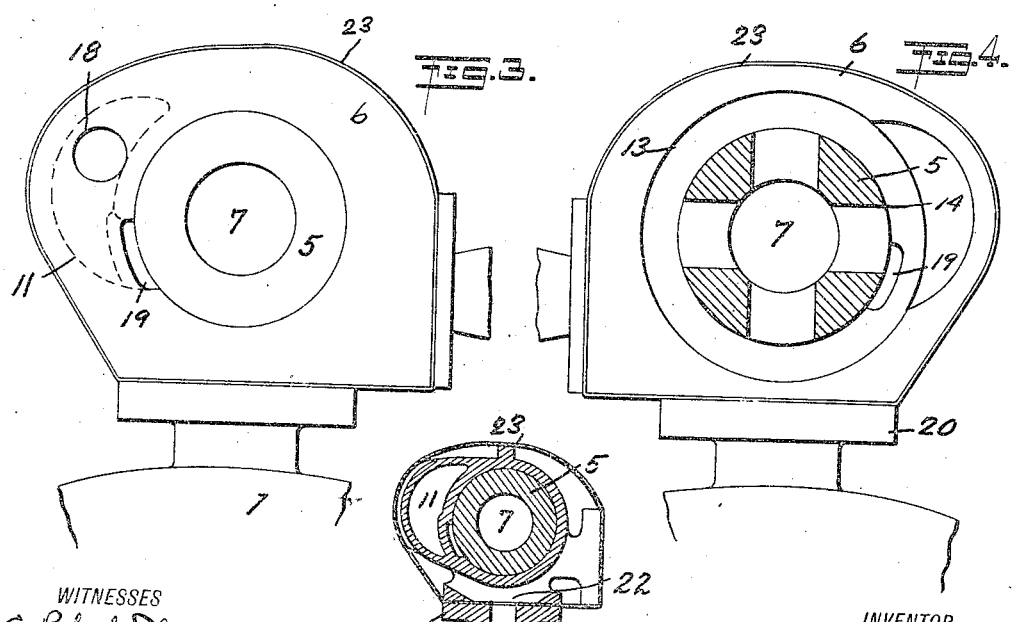
WITNESSES
G. Robert Thomas
E. Greenberger
INVENTOR
Eugene M. Bournonville
BY
ATTORNEY E. M. BOURNONVILLE.
INTERNAL COMBUSTION ENGINE.
APPLICATION FILED FEB. 11, 1914.
1,119,494.
Patented Dec. 1, 1914
3 SHEETS—SHEET 3.
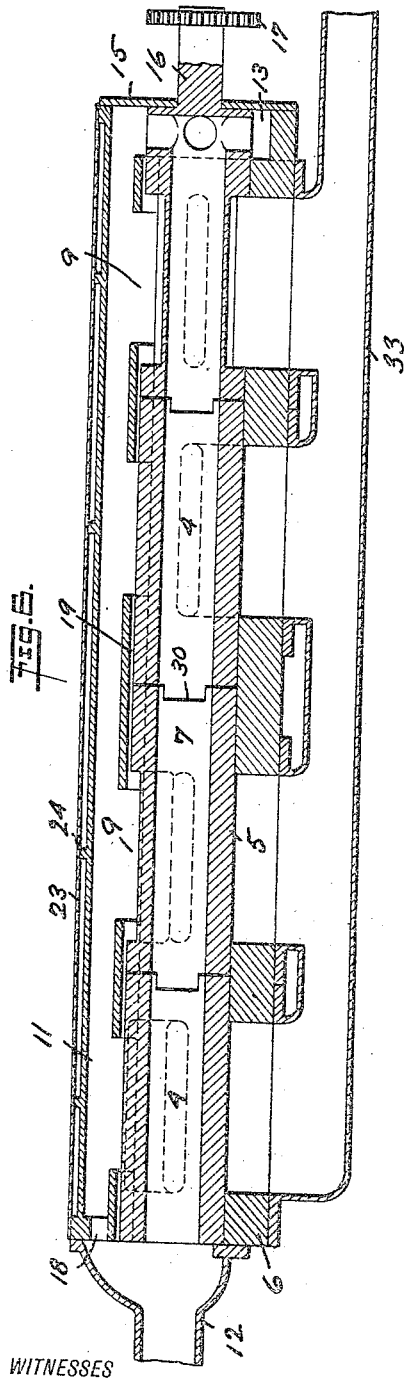
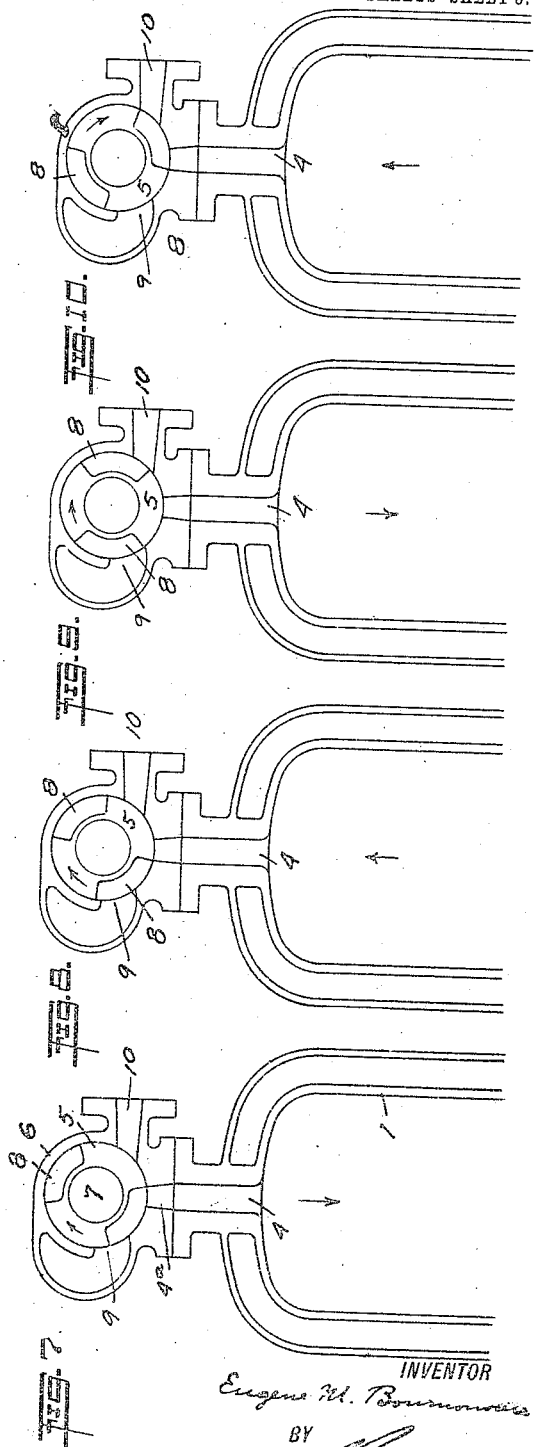
WITNESSES
G. Robert Thomas
E. Greenberger.
INVENTOR
Eugene M. Bournonville
BY
ATTORNEY

EUGENE M. BOURNONVILLE, OF JERSEY CITY, NEW JERSEY.

INTERNAL-COMBUSTION ENGINE.

1,119,494.  Specification of Letters Patent.  Patented Dec. 1, 1914.

Application filed February 11, 1914. Serial No. 817,990.

*To all whom it may concern:*

Be it known that I, EUGENE M. BOURNONVILLE, a citizen of the United States, and resident of Jersey City, in the county of Hudson and State of New Jersey, have invented certain new and useful Improvements in Internal-Combustion Engines, of which the following is a specification.

The object of my invention is to provide a simple and efficient rotary valve for internal combustion engines.

The valve structure illustrated herein resembles in its main features that disclosed in my co-pending application, filed July 1, 1914, Serial No. 848,351, for which broad claims generic to the two constructions are reserved. Both cases embody means in the casing of a rotary cylindrical valve for multicylinder engines whereby fuel gases containing a percentage of lubricant are conducted in contact with the surface of the valve throughout its length, and are concerned more especially with a construction wherein the valve is cooled by fresh gases flowing through its interior and thence admitted to an intake manifold, the valve having external pockets in its sides which alternately connect a single port in each cylinder with the intake manifold and with the exhaust. In the particular construction shown in application No. 848,351 aforesaid, the intake manifold itself is in free communication with the surface of the valve throughout the length of the latter and performs the lubricating function. In the present case a special lubricating channel is provided, and the claims appended hereto are directed to such a construction. Other features illustrated herein but not claimed are reserved for the said application No. 848,351.

In the accompanying drawings showing a preferred illustrative embodiment of the invention: Figure 1 is a vertical longitudinal section through an engine embodying the invention; Fig. 2 is a vertical transverse section through the upper part of one of the cylinders and the valve structure thereof; Fig. 3 is a view taken at one end of the valve; Fig. 4 is a sectional view taken at the other end of the valve; Fig. 5 is a transverse section through the valve on a reduced scale showing the port for admitting cooling water; Fig. 6 is a horizontal section through the valve; and Figs. 7 to 10 are semi-diagrammatic views showing different positions of the valve during a cycle.

The engine may comprise any desired number of cylinders 1, containing reciprocating pistons 2 connected in the usual manner to a crank shaft. In the head of each cylinder is a single port 4, which serves both for intake and exhaust. These ports are of slot-like character, being elongated lengthwise of the series of cylinders and narrow in the transverse direction.

The valve 5 is disposed lengthwise over the heads of the cylinders, rotating within a suitable casing 6. This casing is provided in the bottom with ports $4^a$ of the same dimensions as the ports 4, with which they register, the ports 4 and $4^a$ together constituting a single passage or cylinder port for each cylinder. In addition, the casing has ports or passages 9 and 10, at opposite sides of each cylinder port, for intake and exhaust respectively. The valve is hollow, being formed with a central longitudinal passage or bore 7, which extends substantially throughout its length; and it is also provided with lateral pockets 8, preferably of substantially the same length as the cylinder ports and of suitable width circumferentially of the valve, their function being to connect the cylinder ports alternately with the intake and exhaust spaces of the casing. These pockets are formed in the thickness of the walls of the valve, as in this manner the heat from the pockets is quickly conducted into the surrounding metal of the walls, thereby avoiding overheating and in particular excessive local heating with consequent danger of distortion. As a further prevention against distortion of the valve and in order to compensate for any distortion therein or in the casing, the valve is made in separate sections, of which there is one for each engine cylinder, the joints between the cylinders being of suitable character, such as indicated, to cause all the sections to turn together as one somewhat flexible structure. These joints afford a slight play at a plurality of points along the length of the valve, so as to permit of independent expansion of the portion over each cylinder, thus preventing binding from excessive buckling or warping, which has hitherto proved a serious difficulty in rotary valve construction for internal combustion engines.

The internal passage 7 in the valve has means of connection with a suitable source of fuel gases, such as a carbureter; and at a remote point is in communication with an external passage or manifold chamber 11 formed in a suitable stationary portion of the structure. Preferably, though not necessarily, this longitudinal passage or manifold chamber is formed in the interior of the wall of the casing 6, at one side of the valve. It communicates with the inner face of the casing by means of separate ports 9, one for each cylinder, and when the manifold is embodied in the casing, as shown, these ports consist of elongated openings formed in the inner wall 34 of the manifold constituting part of the wall encircling the valve. In the particular construction shown, the passage 7 in the interior of the valve is connected with the source of supply by means of a fitting 12, which is secured to one end of the casing 6, the interior of this fitting or conduit being in free communication with the open end of said passage. At the opposite end of the valve, communication between the passage 7 and the manifold chamber 11 is afforded by a chamber 13, which is formed by enlarging the internal dimensions of the casing at this point, to receive the fresh gases emerging from openings 14 formed through the walls of the valve. From this chamber the gases flow directly into the full-open end of the manifold chamber 11, as will be apparent from an inspection of Fig. 4.

The outer end of the chamber 13 is closed by an apertured plate 15, through which projects a shaft 16 suitably secured to the end of the valve. This shaft bears a gear or sprocket 17, by which the valve is driven in proper time with the crank shaft. The valve finds its bearing in the interior of the casing 6, but it will be understood that special bearings may be provided, if, and where, desired.

In order to insure an adequate supply of fresh gases in the manifold chamber 11, additional means are provided for admitting fresh gases thereto. To this end the said chamber is shown as communicating with the interior of the supply fitting 12 by means of a port 18 of restricted area formed through this end of the casing 6. It will thus be observed that the chamber 18 receives its gas supply from both ends, thus insuring an adequate amount of gas for each of the engine cylinders and tending to equalize the temperature and quantity of gas which is drawn in by the several cylinders.

The inner face of the valve casing is also provided for lubricating purposes with a special longitudinal channel 19, which preferably intersects the several ports 9, though it might be located elsewhere and is independently and constantly filled with fresh gases. To this end it is shown as extending the entire length of the casing across the wall portions 35 between the ports and through the end walls of the casing so as to communicate at its opposite ends with the interior of the supply fitting 12 and the enlarged chamber 13, respectively.

Suitable provisions are made for waterjacketing the valve casing. As shown, the casing is seated on flanges 20 formed on the heads of the engine cylinders, and these flanges have, in addition to the ports 4, openings 21 communicating with the engine water-jackets. The base of the valve casing is provided with registering openings 22, which are branched as shown in Fig. 5, so as to open through opposite sides of the casing. The water thus permitted to flow around the valve casing is confined by a sheet metal jacket 23, which is spaced from the outside of the casing by suitable ribs 24 and posts 25. This jacket is preferably extended entirely around the casing, with its lateral portions brought beneath the base thereof so as to be clamped between this base and the cylinder flanges 20. Suitable openings are formed in the sheet metal at the regions of the ports 4ª and 10 and the openings 21, 22. As shown, the jacket space is greater at the side of the casing having the exhaust ports 10 and the flange 26, to which the exhaust manifold 33 is secured.

In the best embodiment of my invention there are two of the pockets 8 for each of the engine cylinders, each of these pockets serving alternately for intake and exhaust. The valve is thus rotated at one-quarter the speed of the crank shaft. By suitably proportioning the ports and pockets, the intake and exhaust can be caused to open and close at any degree before or after dead center desired. Large and easy passages are afforded for the flow of the gases, full opening of both the intake and exhaust is obtained promptly, and each cut-away portion of the valve is subjected to the heat of the exhaust only once in four revolutions of the crank shaft. At the same time the valve is kept cool by the constant passage of fresh gases through its interior.

Lubrication is provided for by introducing a suitable amount of lubricating oil into the fuel. The channel 19, extending throughout the length of the casing and constantly filled with fresh gases in contact with the surface of the valve, consequently forms in effect a lubricating duct. Fresh gases are also trapped in the pockets and carried around in contact with the inner face of the casing, so as to lubricate the bearing surfaces at these regions.

The pockets 8 are preferably of the same length as the cylinder ports 4, 4ª, but longer than the casing ports 9 (see Fig. 1). From this it results that at each suction stroke of the piston of each cylinder gases are drawn from the channel 19, over the surface of the valve at each end of the pocket then communicating with the ports 9 and 4ª, thereby compelling movement of gases through said channel and aiding in the lubricating effect.

At the sides of the pockets the surface of the valve is formed with ribbed areas 31, which are produced by making small parallel longitudinal channels, say of a width and depth of about a thirty-second of an inch and spaced apart about a sixteenth of an inch. These ribbed areas serve to keep the inner surface of the valve casing free from carbon, but in order not to become filled with carbon themselves they are confined to such portions of the circumference of the valve that when the explosion occurs and during the working stroke, a plain surface of the valve closes the cylinder port. During the compression strokes, however, the ribbed portions are opposite the cylinder ports, and the forcing of the fuel gases into the channels which results is an advantage because it promotes lubrication. In this connection the channels preferably extend at both ends somewhat beyond the valve pockets, so that the oil-bearing gases are forced into contact with portions of the inner surface of the casing which are not lubricated by the portions of trapped gases that are carried by the pockets from the intake ports to the exhaust ports.

In operation the valve turns in the direction of the arrow at one-quarter the speed of the crank shaft. Fresh gases are constantly sucked from the carbureter throughout the length of the hollow interior of the valve. They thence pass in the reverse direction in a suitable manifold chamber, such as 11, and through the ports 9 reach the pockets 8 at the times when the latter place these ports in communication with the cylinder ports. An additional supply of fresh gases also enters the manifold at the end adjacent the source of supply through a port such as indicated at 18. The channel 19 is also kept filled with fresh gases, as already described, thus further insuring an adequate charge for each cylinder and also serving as a means for effecting lubrication of the valve. It will be understood that the parts are so timed that one of the pockets 8 for each cylinder connects the cylinder valve with the intake 9 during the suction stroke; and during the compression and firing strokes the cylinder port is covered by one of the solid bearing surfaces between the pockets. During the exhaust stroke the other pocket connects the cylinder port with the exhaust 10; and during the next stroke, which is a suction stroke, this same pocket connects the cylinder port with the intake, so that a new charge is drawn into the cylinder. During the explosion the pockets are disposed at the sides, so that the upper portion of the valve which transmits the thrust to the top of the casing possesses a full and unbroken bearing surface.

It will be observed that the valve casing and valve are removable as a unit from the cylinder heads.

What I claim as new is:

1. In an internal combustion engine provided with cylinders and pistons, a rotary valve having a longitudinal passage in its interior and lateral pockets, and suitable means for supplying said passage with fuel gases, in combination with stationary means affording a valve casing and a longitudinal manifold chamber having communication with the internal passage in said valve, said manifold chamber having separate ports opening through the inner face of said casing and arranged to be connected with the cylinder ports by said pockets at the proper times, there being also a special longitudinal lubricating channel in the inner face of said casing intersecting said ports and extending across the wall portions therebetween and open at its end to the supply of fresh gases.

2. In an internal combustion engine provided with cylinders and pistons, each cylinder having a port serving for both intake and exhaust, a rotary valve having a longitudinal passage in its interior and lateral pockets, and suitable means for supplying said passage with fuel gases, in combination with stationary means affording a valve casing and a longitudinal manifold chamber having communication with the passage in said valve and adapted to be connected with the cylinder ports by said pockets at the proper times, said casing also having a special longitudinal lubricating channel in its inner face extending substantially the full length of the valve and having means whereby it is constantly filled with fresh gases.

3. In an internal combustion engine, the combination with a series of cylinders and pistons therein, of a valve casing extending lengthwise of said series of cylinders and having narrow ports one for each cylinder elongated lengthwise of the casing and opening through the cylinder heads into the cylinders, said casing also having intake and exhaust ports and being further provided with a longitudinal channel on its inner surface constructed and arranged to be supplied with fresh gases independently of said intake ports, and a rotary valve in said casing having lateral pockets adapted to connect the cylinder ports alternately with said intake and exhaust ports, said channel being arranged to communicate with said pockets at the times when the latter connect the cylinder and intake ports of the respective cylinders and said intake ports being shorter lengthwise of the casing than said pockets.

In witness whereof, I have signed my name in the presence of two subscribing witnesses.

EUGENE M. BOURNONVILLE.

Witnesses:
J. F. BRANDENBURG,
E. GREENBERGER.